United States Patent
Foster et al.

(10) Patent No.: US 8,328,202 B2
(45) Date of Patent: Dec. 11, 2012

(54) SEAL ASSEMBLY FOR HIGH PRESSURE DYNAMIC AND STATIC SERVICES

(75) Inventors: Mike Foster, Foothill Ranch, CA (US); Majid Ghasiri, Foothill Ranch, CA (US)

(73) Assignee: Bal Seal Engineering, Inc., Foothill Ranch, CA (US)

( * ) Notice: Subject to any disclaimer, the term of this patent is extended or adjusted under 35 U.S.C. 154(b) by 810 days.

(21) Appl. No.: 12/329,405

(22) Filed: Dec. 5, 2008

(65) Prior Publication Data

US 2009/0146379 A1     Jun. 11, 2009

Related U.S. Application Data

(60) Provisional application No. 61/012,179, filed on Dec. 7, 2007.

(51) Int. Cl.
*F16J 15/34* (2006.01)
*F16J 15/32* (2006.01)

(52) U.S. Cl. ........................................ 277/572; 277/551

(58) Field of Classification Search .................. 277/549, 277/551, 552, 558, 564, 565, 566, 567, 568, 277/569, 572, 573, 576, 577

See application file for complete search history.

(56) References Cited

U.S. PATENT DOCUMENTS

| 4,231,578 A | 11/1980 | Traub |
| 6,161,838 A | 12/2000 | Balsells |
| 6,264,205 B1 * | 7/2001 | Balsells ........................ 277/551 |
| 6,367,812 B1 | 4/2002 | Reinhardt et al. |
| 6,641,141 B2 | 11/2003 | Schroeder |

OTHER PUBLICATIONS

International Search Report from corresponding PCT Application No. PCT/US2008/085901, filed Dec. 8, 2008 (4 pages).
Written Opinion from corresponding PCT Application No. PCT/US2008/085901, filed Dec. 8, 2008 (5 pages).

* cited by examiner

*Primary Examiner* — Gilbert Lee
(74) *Attorney, Agent, or Firm* — Klein, O'Neill & Singh, LLP

(57) ABSTRACT

Seal assemblies and methods for forming them are described. Aspects of the seal assemblies include a seal ring made of a relative soft material supported by a specially configured backing ring made of a much higher modulus material, such as ferrous and non-ferrous metal or engineered plastic. The seal assemblies may optionally include a retaining ring to prevent slippage relative to the environment or housing in which they are placed and to prevent shuttling. The seal assemblies may also optionally include an energizer to alter the force generating by a sealing lip on the seal ring.

23 Claims, 5 Drawing Sheets

SEAL ASSEMBLY FOR HIGH PRESSURE DYNAMIC AND STATIC SERVICES

CROSS-REFERENCE TO RELATED APPLICATION

This is a regular utility application of provisional application Ser. No. 61/012,179, filed Dec. 7, 2007, which bears the same title. The contents of the provisional application are expressly incorporated herein by reference for all purposes.

BACKGROUND

Seal assemblies are generally discussed herein for sealing a first environment or chamber from a second environment or chamber of a machinery or equipment with particular discussions extended to shaft seals in which a seal is retained within a housing on a shaft and a constant pressure is exerted by the seal on the shaft to maintain a dynamic seal between the shaft and the seal. Seal assemblies for use in static services are also discussed.

Seal assemblies for rotating, reciprocating, and face seal applications are well known in the art and are taught by, for example, U.S. Pat. Nos. 4,805,943; 4,830,344; 5,134,244; 5,265,890; 5,979,904; 5,984,316; 5,992,856; 6,050,572; 6,161,838; 6,264,205; and 6,641,141, the contents of each of which are expressly incorporated herein by reference.

Prior art polytetrafluoroethylene (PTFE) based seals are preferred by some because they provide flexibility, low-friction, and self-lubrication when used in sealing arrangements with a moving shaft, such as a rotating or reciprocating shaft. However, PTFE material used in making seals has a natural tendency to cold-flow and creep, especially in high temperature, pressure, and surface velocity applications, which are common in the oil and gas industry and other applications. Thus, operating life of PTFE-based seals is shorter than preferred when placed in these applications and conditions.

PolyEtherEtherKetone (PEEK) material, on the other hand, is better suited for high pressure, temperature and velocity applications. However, PEEK material is rigid and generally is not applicable or workable as a primary contact seal against moveable shafts, such as rotary or reciprocating shafts.

It has been found that when a relatively softer polymer seal is supported by a more temperature resistant and higher modulus polymer jacket or housing (such as PEEK or other materials as further discussed below), the sealing characteristics and operating life of the overall seal against a moveable surface is substantially improved while its propensity for distortion, cold-flow and creep is minimized.

SUMMARY

Aspects of the present invention comprises a seal assembly comprising a rigid backing ring made of a first material having an axially extending flange; a seal ring positioned next to the backing ring and in mechanical engagement with the backing ring, said seal ring comprising a lip extending radially for dynamic contact with a moveable shaft; and a retaining ring positioned next to the seal ring and in mechanical engagement with the seal ring; wherein a spring is positioned in a holding bore, which is defined, at least in part, by the seal ring and the retaining ring.

Optionally, the seal assembly comprises an outside flange and an inside flange separated from one another by a center channel section.

In one aspect of the present invention, the seal assembly comprises a seal ring made from a PTFE material, a polymer material, or a PTFE composite with other performance enhancing additives.

In one aspect of the present invention, the seal assembly comprises a backing and support ring made from a PEEK or PEEK composite or other high temperature resistant and high modulus polymer materials, a metal, or other high performance engineering plastic material having suitable properties for the application.

In another aspect of the present invention, a seal assembly is provided for sealing engagement with a shaft comprises a seal ring comprising an outside flange, an inside flange, and a center channel section; a canted-coil spring or O-ring, cantilever vee spring or other types of seal energizer positioned between the inside flange and the outside flange; a backing ring in adjacent contact with the center channel section and having a flange extending co-axially with the inside flange of the seal ring; and wherein the inside flange further comprises a seal lip comprising an arcuate section overlapping an end edge of the flange of the backing ring. Seal energizers of the type that further assist a lip seal in exerting a positive force against a sealing surface are preferred, but energizers are not always required. For example, in certain applications, the resiliency of the seal is adequate for sealing against the shaft without an energizer.

The present invention is further directed to a method for preventing or minimizing seal distortion of a relatively pliable seal in high pressure applications. The method comprises the steps of creating a backing ring having an axially extending flange; mounting a seal ring comprising an axially extending flange and mechanically coupling the two axially extending flanges together; placing a canted-coil spring or other energizer device in a hold bore such that a spring force generated by the energizer or the canted-coil spring is directed against the axially extending flange of the seal ring; and mounting the combination backing ring, seal ring, and canted coil-spring in a sealing environment such that the axially extending flange of the seal ring is directed towards a high pressure region of the sealing environment.

DETAILED DESCRIPTION

The detailed description set forth below in connection with the appended drawings is intended as a description of the presently preferred embodiments of seal assemblies provided in accordance with aspects of the present invention and is not intended to represent the only forms in which the present invention may be constructed or utilized. The description sets forth the features and the steps for constructing and using the seal assemblies of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like or similar elements or features.

Figure 1:
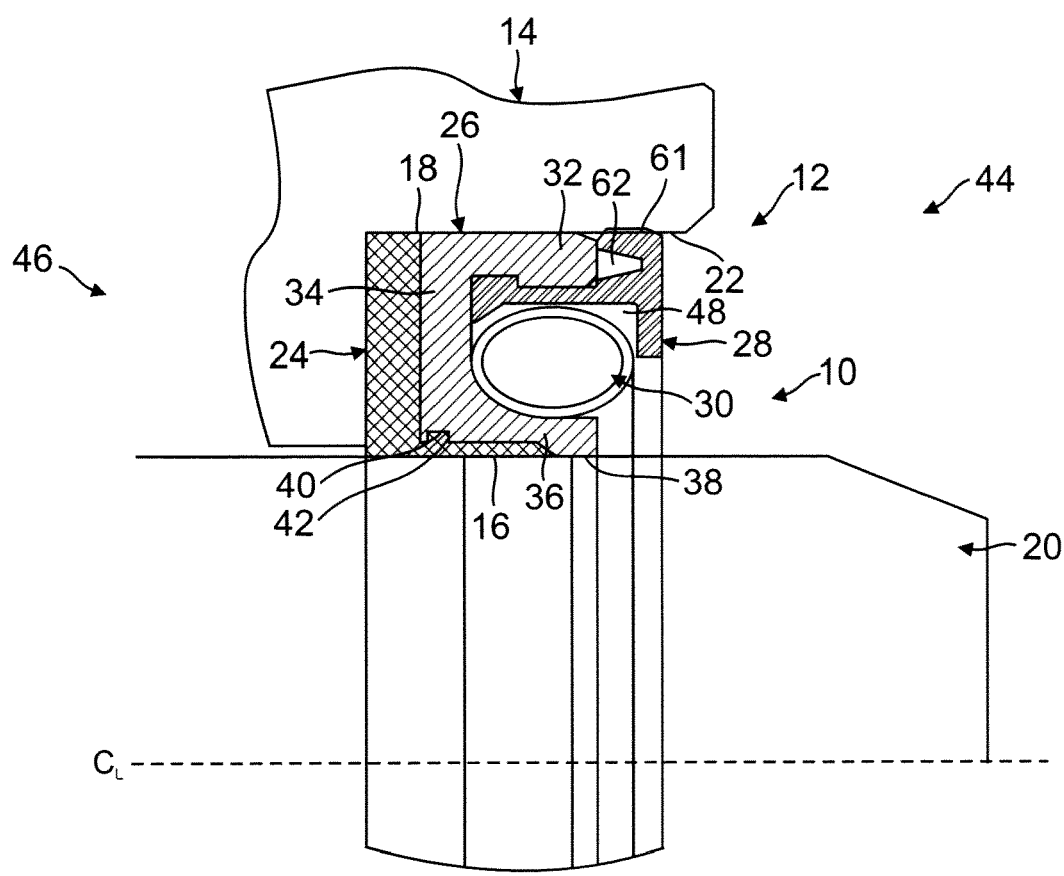
FIG. 1 is a cross-sectional side view of a seal assembly mounted on a moveable shaft inside a seal cavity.

With reference now to FIG. 1, there is shown a cross-sectional side view of a seal assembly 10 mounted in a gland, stuffing box, or sealing cavity 12 of a rotating, oscillating, or static equipment, such as a pump, compressor, turbine, gear box, or engine. The seal assembly 10 is mounted to a gland or equipment housing 14 and is preferably stationarily positioned relative to the gland 14. The seal assembly is generally circular in nature and comprises an inside diameter 16 in dynamic sealing communication with a shaft 20 and an outside diameter 18 in static communication with an internal bore 22 of the gland 14. Known interference requirements between the seal and the shaft and between the seal and the gland 14 may be used to implement the preferred seal assembly.

In the embodiment shown, the seal assembly 10 is formed of at least four distinct components, namely an externally facing backing ring 24, a seal ring 26, an inner retaining ring 28, and a energizer 30, which may be a resilient member, a canted-coil spring, cantilever vee spring, or an O-ring (not shown) of suitable resilient characteristics to provide a biasing force, as further discussed below. In the specific embodiment shown, the energizer 30 is a canted coil spring. In the preferred assembly, the seal ring 26 comprises an outside flange 32, a center channel section 34, and an inside flange 36 and is made from a polymer material, which in one embodiment is a PTFE material. Other polymer and PTFE-based composite materials may be used as sealing components of the assembly. The inside flange 36 extends axially internally from the center channel section 34 and terminates in a generally linear lip 38. The lip 38 is in dynamic contact with the shaft 20, in a cross-sectional view, along a straight line. In a less preferred embodiment, the lip 38 makes a single point contact with the shaft. Exemplary O-rings or energizers are disclosed in U.S. Pat. Nos. 4,893,795; 4,974,821; 5,108,078; 5,139,276; and 7,175,441, the contents of each of which are expressly incorporated herein by reference.

In one exemplary embodiment, the inside flange 26 further incorporates a plurality of spaced-apart notches or recesses 40 formed along an external surface for mating with corresponding bumps or projections 42 formed on the backing ring 24. The engagement between the two secure the seal ring 26 to the backing ring 24 in fixed orientation. In the embodiment shown, the backing ring 24 is made from a PEEK or a PEEK composite material. Its rigid characteristic allows the backing and support ring to resist pressure force from a higher pressure region 44 that would tend to push the seal ring 26 outwardly to a lower pressure region 46. Thus, the backing and support ring acts to resist distortion, cold flow or creep of the seal ring. In an alternative embodiment, the backing ring 24 may be made from a suitably stiff strong material such as stainless steel, ferrous or non-ferrous metals, or engineering plastics.

The inner retaining ring 28 is configured to mate with the outside flange 32 of the seal ring 26. In one exemplary embodiment, a snap fit arrangement is provided to engage the two, which when assembled, create a holding bore 48 for capturing the energizer, such as a canted-coil spring or O-ring 30. Tire spring or O-ring (not shown) 30 may be a radial or axial canted coil spring and the surfaces of the inner retaining ring 28 and the seal ring 26 define the holding bore 48. The holding bore therefore has a contour that is defined, at least in part, by the inner retaining ring and the seal ring, which may be altered to create different holding space for the energizer 30. Using the physical contour of the holding bore to modify the spring deflection will in turn allow the radial force acting on the sealing lip 38 to be adjusted upwardly or downwardly.

In one exemplary embodiment, the inner retaining ring 28 is made from a PEEK material or a metal material, such as stainless steel or any other ferrous or non-ferrous metal or engineering plastic meeting the application requirements (such as high modulus). The outer diameter is sized as an interference fit 61 to accommodate tolerance variations. The groove inboard of the outer diameter 62 allows adequate flexibility to ensure that the ring locks the seal assembly to the fixed housing.

The seal assembly 10 is compression fitted into the internal bore 22 of the gland 14. In the embodiment shown, this is accomplished by providing an external area along the outside flange 32 designed to be compressed by the relative diameter of the internal bore 22.

Figure 2:
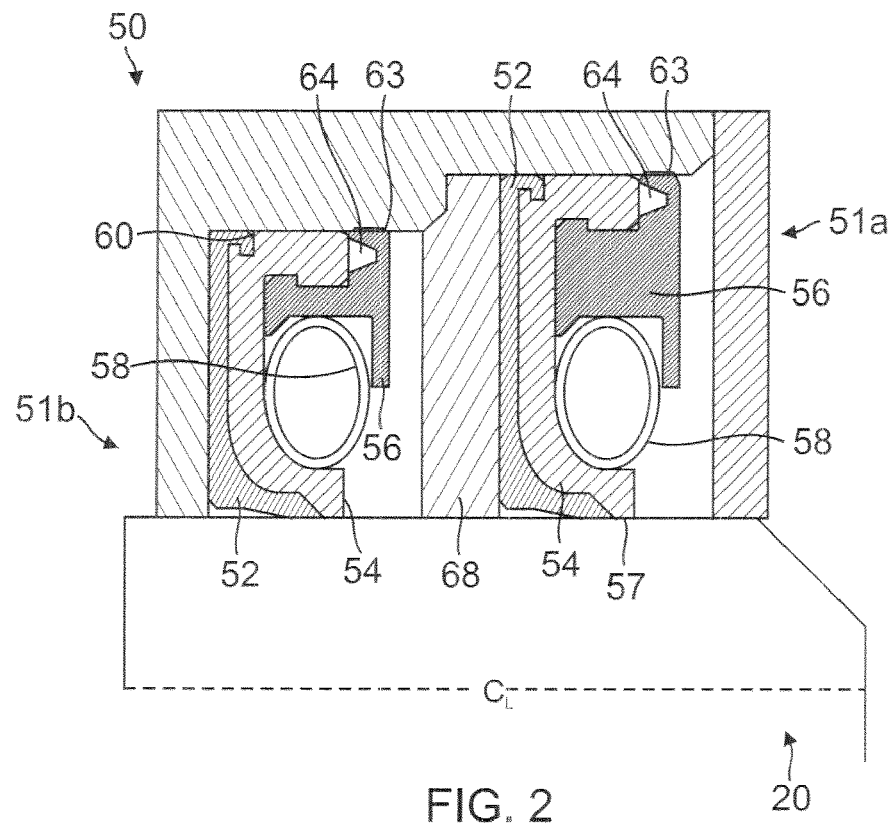
FIG. 2 is a cross-sectional side view of a seal assembly comprising a tandem seal set mounted on a moveable shaft.

FIG. 2 is a cross-sectional side view of an alternative seal assembly 50 provided in accordance with aspects of the present invention. In one exemplary embodiment, the alternative seal assembly 50 comprises two seat assemblies mounted in-line 51a, 51b, each comprising a backing ring 52, a seal ring 54, an inner retaining ring 56, and an energizer 58, such as a canted-coil spring, which may be an axially canted coil spring or a radially canted coil spring.

The two in-line seal assemblies are configured for high pressure applications. As is well known in the art, baring leakage, pressure passing through the inner seal assembly 51a is reduced by the sealing engagement between the sealing lip 57 and the shaft 20. Thus, the outer seal assembly 51b should experience less pressure from the stuffing box or seal cavity than the inner seal assembly 51a, provided there is no leakage. In-line seals of this configuration also have the advantage of redundancy. Additionally, the first seal protects the second seal from debris and potential damage thus permitting the second seal to provide longer useful life should the first seal begin to fail.

In the embodiment shown, the inner seal 51a is separated by the outer seal 51b by a divider plate 68, which provides a back support for supporting the backing ring 52 of the inner seal assembly 51a. It is also preferable to have varying outer diameters between the inner and outer seals to facilitate assembly.

In one exemplary embodiment, the seal ring 54 and the backing ring 52 are engaged to one another in fixed orientation by a detent engagement 60 near the outside flange of the seal ring. Alternatively, the seal ring 54 and the backing ring 52 may engage one another using both a bump/notch engagement, as discussed above with reference to FIG. 1, and a detent engagement.

In one exemplary embodiment, the inner retaining ring 56 is made from a PEEK material or a metal material, such as stainless steel or any other ferrous or non-ferrous metal or engineering plastic meeting the application requirements (such as high modulus). The outer diameter is sized with an interference fit 63 to accommodate tolerance variations. The groove 64 inboard of the outer diameter allows adequate flexibility to ensure that the ring locks the seal assembly to the fixed housing. In certain embodiments, if the supporting backing ring 52 is made from a PEEK material, it can be fiber-filled to enhance its mechanical properties and preferably has additives to lower its friction coefficient.

Figure 3:
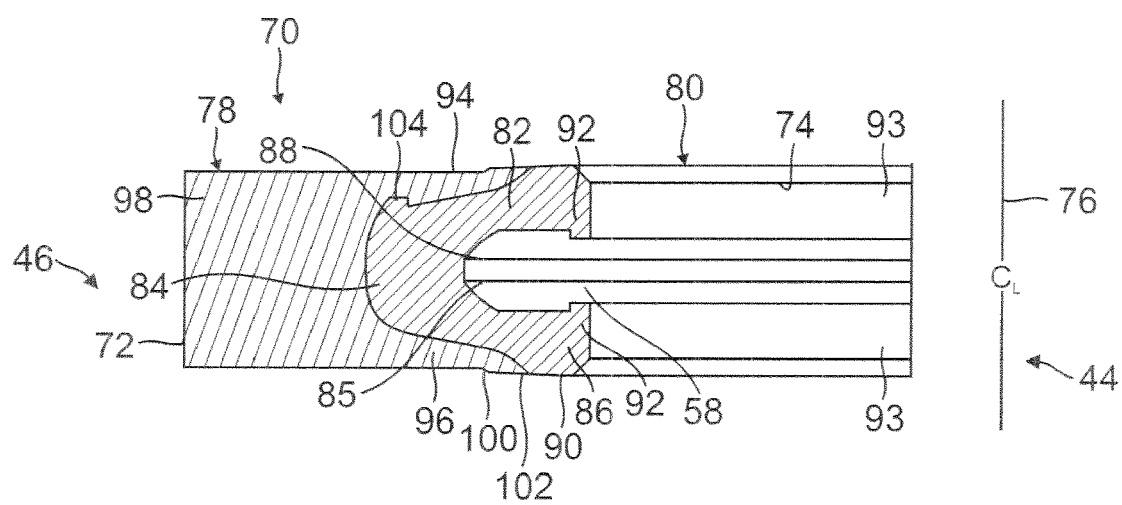
FIG. 3 is a cross-sectional side view of a seal assembly provided in accordance with another aspect of the present invention, which may be used in a rotary or a static application.

FIG. 3 is a cross-sectional view of an exemplary seal assembly 70 provided in accordance with another aspect of the present invention, which may be used for a high pressure rotary or static applications. The current assembly embodies a ring and has an outside diameter 72 and an inside diameter 74 sized to fit over a shaft 76, which is shown schematically with a centerline ₵. The seal ring 80 has a generally C-shape cross-section that includes a first flange 82, a center channel section 84, and a second flange 84 defining a holding bore 86 therebetween. The contour or shape of the holding bore may be modified or adjusted to vary the manner in which an energizer is retained therein. For example, the center race section may be arcuate in shape or may incorporate a flat strip or multiple flat strips and the sections near the lips 92 incorporate bumps or protrusions.

The seal ring 80 is preferably made from a resilient material, such as PTFE, and has a contact length 90 formed at an end of the first and second flanges 82, 86 for forming a line contact with a surface to seal against, such as a housing, gland, shaft, or stuffing box. Internally, the seal ring 80 incorporates a pair of retaining lips 92 for capturing an energizer (not shown), which may be a canted coil spring, an O-ring, or other devices configured to create a biasing force on the two flanges 82, 86.

The backing ring 78 is preferably made from a high modulus material, such as PEEK, PEEK composite or metallic material, or an engineered plastic. In one preferred embodiment, the backing ring 78 incorporates a corresponding mating C-shape cross-section to support the seal ring along multiple sides. In particular, the backing ring 78 has a first flange 94 for supporting the first flange 82 of the seal ring, a second flange 96 for supporting the second flange 86 of the seal ring, and a center channel section 98 for supporting the center channel section of the seal ring. The multi-sided support helps the seal ring 80 to resist radial, and/or axial distortion or creep due to the differential between a high pressure region 44 and a low pressure region 46. In one particular embodiment, the second flange 96 and optionally the outside flange 94 incorporate a radiussed section 100 to form a line contact 102 along an end portion of the respective flange. However, the line contact 102 of the backing support is preferably slightly larger in diameter than the seal ring so that only the seal ring makes contact with the shaft or other housing structure. Most preferably, the seal ring has a longer contact line than the contact line on the backing ring. The backing ring 78 and the seal ring 80 may engage one another by one or more detents 104.

Thus, aspects of the present invention include a seal assembly comprising a seal ring having multiple external side walls supported by a backing ring made of a material having substantially higher modulus properties. In one particular embodiment, the backing ring supports the seal ring along a first flange, a center channel section, and a second flange of the seal ring to minimize distortion. The multi-sided support preferably reduces or minimizes deflection of the seal ring along the radial and/or axial direction. Although the backing ring has a generally rectangular center channel section, it may be contoured or have distinct lines or notches.

Figure 4:
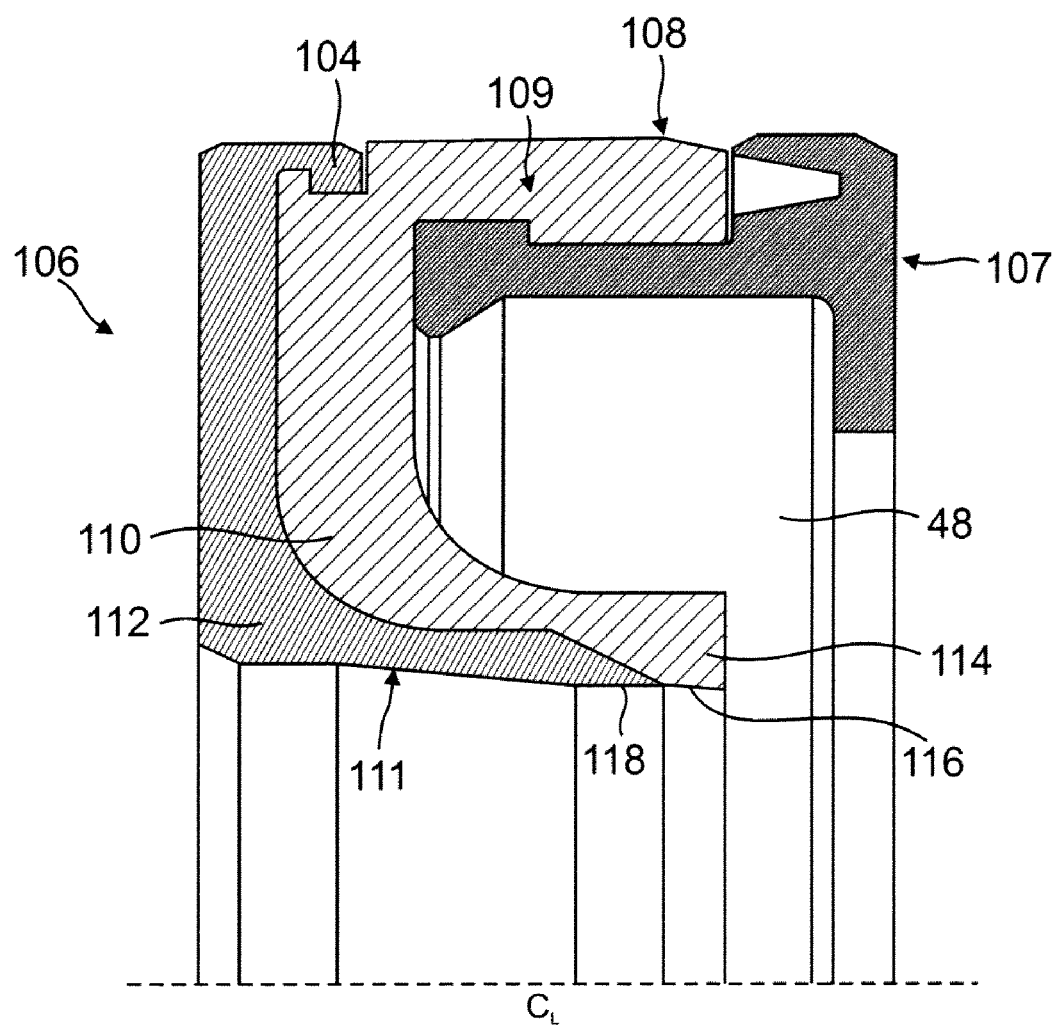
FIG. 4 is a cross-sectional side view of a seal assembly provided in accordance with another aspect of the present invention, which may be used in a rotary or a reciprocating application.

FIG. 4 shows a seal assembly 106 having a similar construction as the outside seal assembly 51b of FIG. 2. Thus, the present invention includes a locking ring 107, a seal ring 109, a backing ring 111, and an optional energizer (not shown), which may be a canted coil spring, an O-ring, or other bias generating devices for biasing the inside flange of the seal ring. However, in the present embodiment, the outer flange 108 and the inner flange 110 of the seal ring are substantially longer than the corresponding sections of the seal ring of FIG. 2. In one embodiment, the flanges are about 30% to about 150% longer than corresponding overall lengths of the seal ring of FIG. 2. The relatively longer lengths create a corresponding larger holding bore 48 to retain an energizer in a different configuration, such as a radial canted coil spring versus an axial canted coil spring. The longer length further allows a relatively longer inside backing flange section 112 to support the inside lip 114 to thereby limit distortion of the contact length 116 due to pressure differentials between a high pressure environment and a lower environment. Although the inside backing flange section 112 has a contact line 118, it preferably does not contact the shaft.

Figure 5:
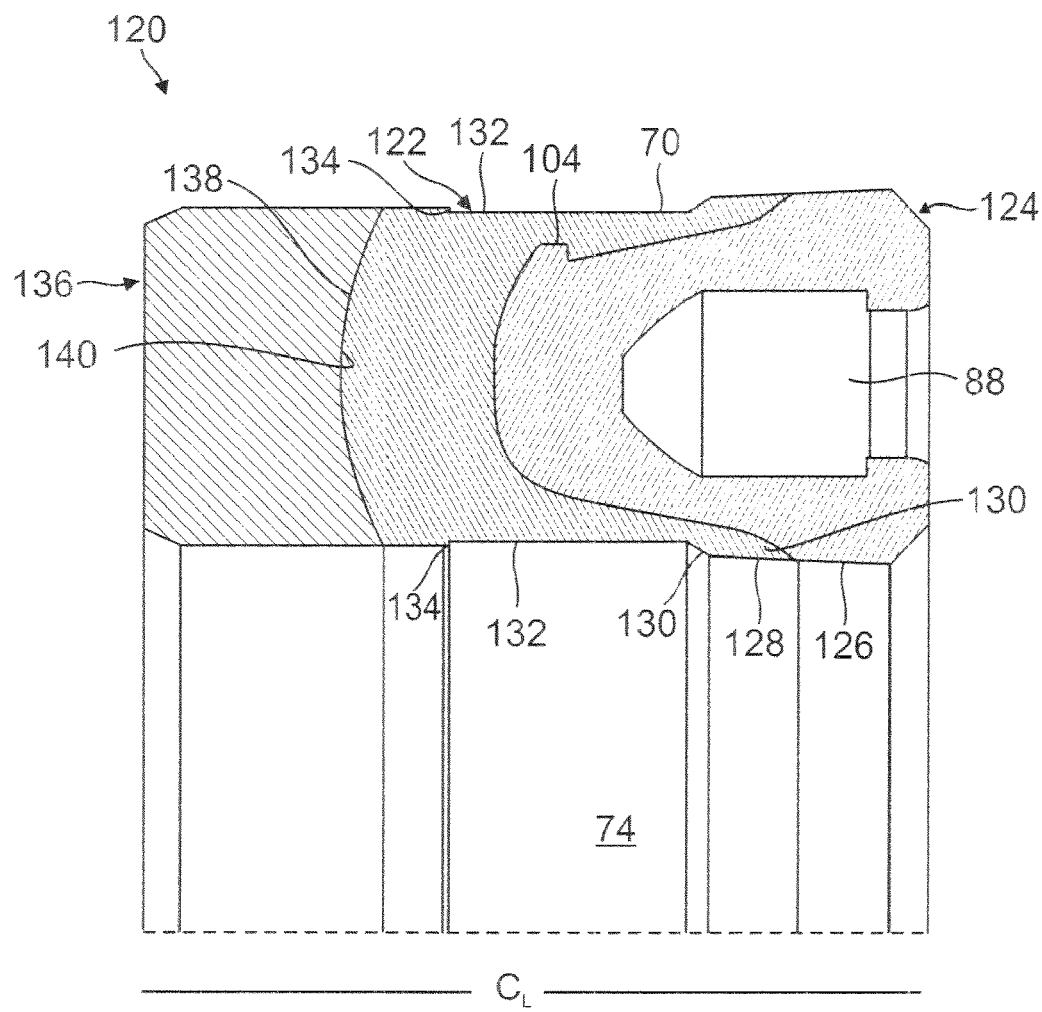
FIG. 5 is a cross-sectional side view of a seal assembly provided in accordance with yet another aspect of the present invention, which may be used in a static or a reciprocating application.

Referring now to FIG. 5, a cross-sectional side view of an alternative seal assembly 120 provided in accordance with another aspect of the present invention is shown. The present seal assembly is somewhat similar to the seal assembly 70 of FIG. 3 in that it incorporates a backing ring 122 and a seal ring 124 without a retaining ring. The ring is also formed orthogonally so that the inner diameter 74 and the outer diameter 72 differ from that of FIG. 3. Thus, an aspect of the present invention is a seal assembly comprising a backing ring made of a first modulus property for supporting a seal ring made of a second modulus property along multiple sides, which include an outer flange side, a central channel side, and an interior flange side, and wherein the first modulus property is higher than the second modulus, property. In one particular embodiment, the seal ring is made from a PTFE material and the backing ring is made from a PEEK material, steel material, or a composite.

As with the seal assembly 70 of FIG. 3, the present seal assembly incorporates a contact length 126 for a line contact with a shaft, shown schematically with a centerline ₵. The backing ring 122 similarly has a contact length 128 that in one embodiment is configured to contact the shaft. The length of the respective contact lengths 126 and 128 is formed by a radiused section 130 on each of the inside flanges. In one embodiment, a center notch or indentation 132 is formed by creating another radiused section 134 on the inside flange. Optionally, the outer flange is provided with a similar center indentation.

As shown, a secondary backing ring 136 is incorporated to further support the seal assembly 120 and in particular the seal ring 124 and the first backing ring 122. The secondary backing ring 136 is formed with an interior arcuate race 138 for mating engagement with a corresponding outer arcuate race 140 of the first backing ring 122. In one particular embodiment, the secondary backing ring 136 is made with a material having a high modulus property, such as PEEK, suitably stiff strong material such as stainless steel, ferrous or non-ferrous metals, or engineering plastics. The secondary backing ring may be a loose piece held by the housing or potentially bonded to the first backing ring or alternatively a mechanical engagement may be used, such as one or more detents. In one embodiment, the seal assembly is made from a seal ring of a first material, a first backing ring of a second material, and a secondary backing ring of a third material. In a particular embodiment, the first material is PTFE or PTFE composition, the second material is PEEK or PEEK composition, and the third material is either a ferrous or a non-ferrous metal. Alternatively, the third material is made from an engineering plastic material. Exemplary engineering plastics include Ultem® (PEI) amorphous polyetherimide polyethersulfone (PES), semi-crystalline polyphenylsulfide (PPS), semi-crystalline polyphthalamide (PPA), among others. Fibers Filler additives may be added to the third material to enhance their properties. The third material for the outer backing ring can also be made from a PEEK material, or PEEK composite material.

Thus, an aspect of the present invention is understood to include a seal assembly comprising a seal ring made of a first material, a first backing ring made of a second material, and a second backing ring made of a third material, and wherein the first backing ring incorporates a cavity comprising multiple sides for supporting the seal ring along multiple sides. In one particular embodiment, the multiple sides include an outer flange, a center channel section, and an inner flange. In another particular embodiment, the seal ring includes a holding bore sized to accommodate an energizer, which in particular embodiments may include a canted coil spring or an O-ring.

Figure 6:
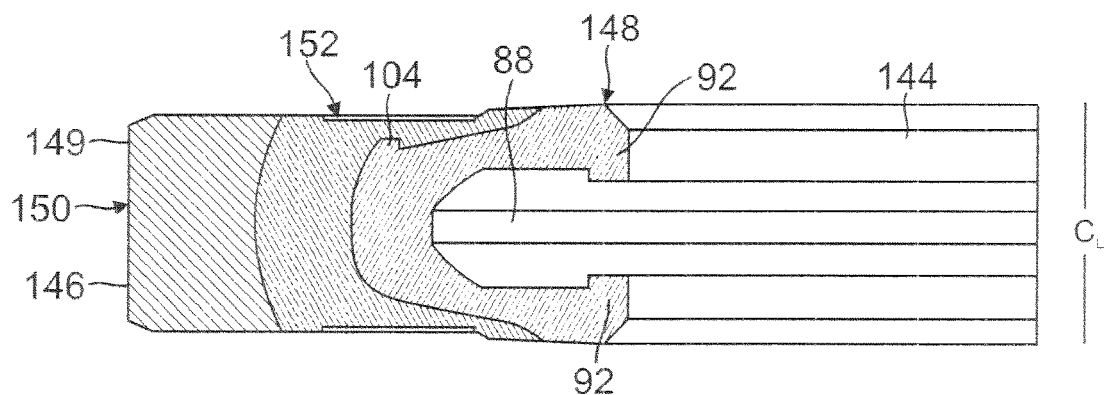
FIG. 6 is a cross-sectional side view of a seal assembly provided in accordance with still another aspect of the present invention, which may be used in a rotary or a static application.

FIG. 6 is a cross-sectional side view a seal assembly 142 provided in accordance with another embodiment of the present invention. The present seal assembly is similar to the seal assembly of FIG. 5 with the exception of the orientation of the overall ring of the seal assembly. In the present embodiment, the ring inside diameter 144 is formed about the two inside lips 92 of the seal ring 148 and the outside diameter is formed about the exterior surface 149 of the secondary backing ring 150. A primary backing ring 152 is incorporated between the seal ring and the secondary backing ring.

Thus, aspects of the present invention is understood to include a seal ring having an inside retaining lip that defines an inside diameter, a first backing ring made of a high modulus material mechanically engaged to the seal ring, and a second backing ring made of a high modulus material surrounding, at least in part, the first backing ring, and wherein an exterior wall surface of the second backing ring define an outside diameter. In one embodiment, the materials of the first backing ring and of the second backing ring are different. In one particular embodiment, the first backing ring 152 is made from a PEEK or PEEK composite material with friction reducing additives and the second backing ring is made from a conventional engineered plastic. In the present embodiment, static sealing may be formed about the inside and outside contact lines 90 and dynamic sealing about the radial surface 93 of the two lips 92.

Figure 7:
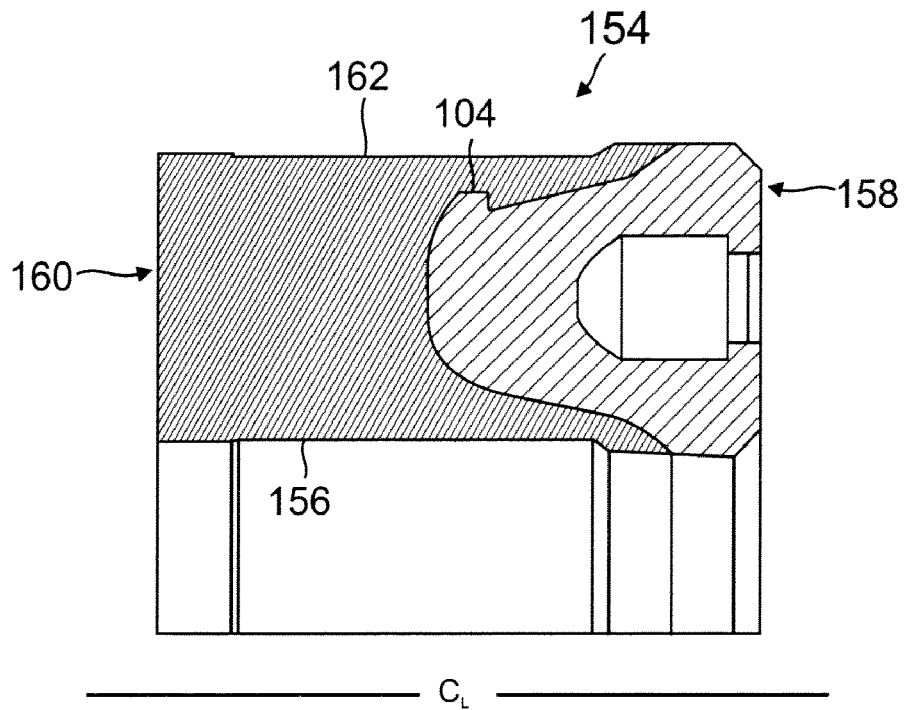
FIG. 7 is a cross-sectional side view of a seal assembly provided in accordance with still another aspect of the present invention, which may be used in a reciprocating or a static application.

FIG. 7 is a cross-sectional side view a seal assembly 154 provided in accordance with yet another embodiment of the present invention. The present seal assembly is similar to the seal assembly 70 of FIG. 3 with the exception of the orientation of the overall ring of the seal assembly. In the present embodiment, the ring inside diameter 156 is formed about both the seal ring 158 and the backing ring 160 and the outside diameter 162 is formed also about both rings.

Figure 8:
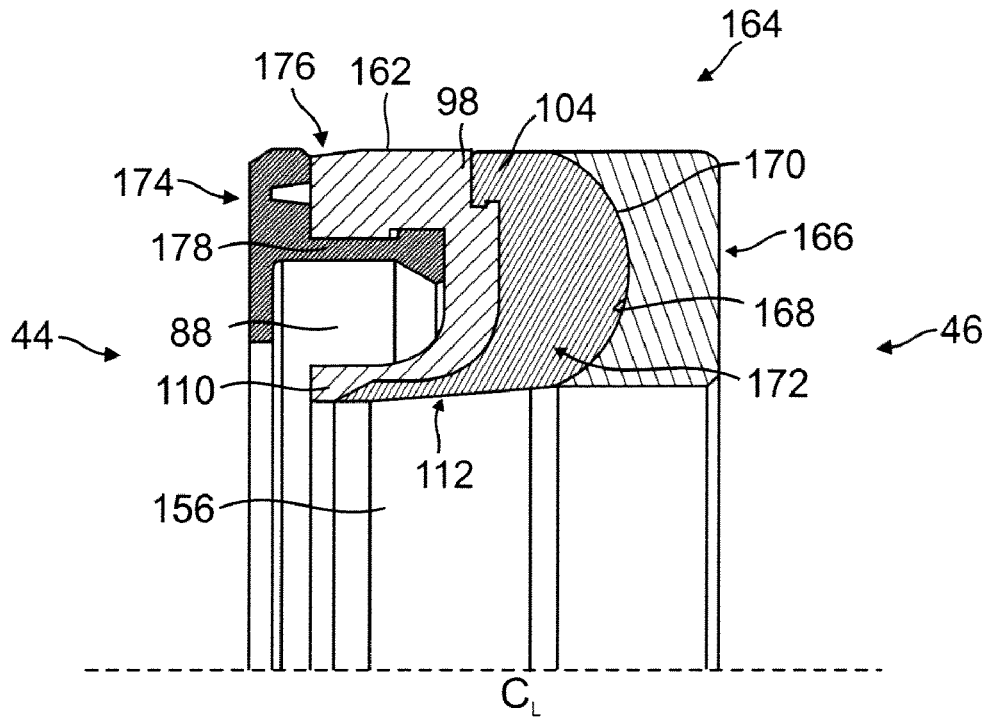
FIG. 8 is a cross-sectional view of another alternative embodiment.

FIG. 8 is a cross-sectional side view of a seal assembly 164 provided in accordance with another embodiment of the present invention. The present seal assembly is similar to the seal assembly 106 of FIG. 4 with the exception of the inclusion of a secondary backing ring 166, which has an arcuate inner race 168 for mating with a corresponding arcuate outer race 170 of the primary backing ring 172. Thus, the present seal assembly 164 is understood to include a locking ring 174 mechanically connected to a seal ring 176, which is mechanically connected to a primary backing ring 172 made of a first material and a secondary backing ring 166 made of a second material. In particular embodiments, mechanical connection between the various pieces can be by way of detents, interference fit, or combinations thereof.

The present alternative embodiment is further understood to include a seal assembly for isolating a high pressure region 44 of an equipment, such as a pump, a compressor, or a turbine as non-limiting examples, from a low pressure region 46 by forming a seal around a shaft (shown schematically with a centerline ₵) along its inside diameter 156 and supporting the seal from distortion with a backing ring, which supports the seal along at least an inner flange 110 of the seal and the central channel section 98 of the seal. In one preferred embodiment, a locking ring is provided, which has a projection 178 that extends into a holding bore of the seal and defines, at least in part, a geometry of the holding bore for accommodating an energizer, which may be a canted coil spring or an O-ring. In a further aspect of the present invention, a secondary backing ring 166 is provided with an arcuate inner race for mating with a corresponding arcuate race of the backing ring.

Although limited embodiments of seal assemblies and their components have been specifically described and illustrated herein, many modifications and variations will be apparent to those skilled in the art. For example, a different combination of pliable seal ring plastic material and rigid plastic housing structure may be used instead of PTFE and PEEK. Furthermore, it is understood and contemplated that features specifically discussed for one seal embodiment may be adopted for inclusion with another seal embodiment, provided the functions are compatible. The present invention further includes methods for forming the seal assemblies as described. Accordingly, it is to be understood that the seal assemblies and their components constructed according to principles of this invention may be embodied other than as specifically described herein. The invention is also defined in the following claims.

What is claimed is:

1. A seal assembly comprising:
   a rigid backing ring made of a first material having an axially extending flange;
   a seal ring positioned next to the rigid backing ring and in mechanical engagement with the rigid backing ring, said seal ring comprising an outside flange and an inside flange comprising a lip for dynamic contact with a moveable shaft, said inside flange being supported by the axially extending flange of the rigid backing ring;
   a retaining ring positioned next to the seal ring and in mechanical engagement with the seal ring;
   wherein a canted coil spring comprising a major axis and a minor axis is positioned in a holding bore, which is defined, at least in part, by the seal ring and the retaining ring; and
   wherein the canted coil spring overlaps and exerts a radial force along the minor axis on the axially extending flange of the rigid backing ring and the inside flange of the seal ring, both of which having sections located directly along a line defined by the minor axis.

2. The seal assembly of claim 1, wherein the section of the inside flange of the seal ring located directly along the line defined by the short axis has a first thickness and the section of the axially extending flange of the rigid backing ring located directly along the line defined by the short axis has a second thickness and wherein the first thickness is larger than the second thickness.

3. The seal assembly of claim 2, wherein the seal ring is made from a polymer material.

4. The seal assembly of claim 3, wherein the poly material is a PTFE (polytetrafluoroethylene) or a PTFE composition material.

5. The seal assembly of claim 3, wherein the backing ring is made from a high modulus and high temperature resistant polymer material, a ferrous metal, or a non-ferrous metal.

6. The seal assembly of claim 1, wherein the rigid backing ring comprises a center channel section in contact with a center channel section of the seal ring, which is located between the inside flange and the outside flange of the seal ring, and wherein the axially extending flange of the rigid backing ring comprises a radiused section.

7. The seal assembly of claim 1, wherein the axially extending flange of the rigid backing ring contacts the inside flange of the seal ring along an entire length of the axially extending flange.

8. A seal assembly for sealing engagement with a shaft comprising:
    a seal ring comprising an outside flange having an outside diameter, an inside flange, a center channel section comprising a length, and a holding bore;
    a backing ring in adjacent contact with all of the length of the center channel section of the seal ring, engages the outside flange of the seal ring in a detent engagement along an outer part of the outside flange, and has a flange comprising a length extending co-axially with the inside flange of the seal ring with a radiused section at an end thereof;
    an energizer positioned in the holding bore and exerts a biasing force against the inside flange of the seal ring and the flange of the backing ring along a radial direction;
    wherein the inside flange of the seal ring further comprises a seal lip comprising an arcuate section overlapping the radiused section of the backing ring.

9. The seal assembly of claim 8, wherein the backing ring comprises an outside flange and wherein the outside flange of the backing ring is in the detent engagement with the seal ring.

10. The seal assembly of claim 8, wherein the energizer is a canted coil spring comprising a major axis and a minor axis and wherein the inside flange of the seal ring and the flange of the backing ring are both located in line with the minor axis.

11. The seal assembly of claim 8, further comprising a secondary backing ring in contact with all of a center channel section of the backing ring.

12. The seal assembly of claim 8, further comprising a retaining ring having a flange projecting into the holding bore and biased by the energizer.

13. The seal assembly of claim 8, further comprising a retaining ring and wherein the flange of the backing ring contacts the inside flange of the seal ring along all of the length of the flange of the backing ring.

14. The seal assembly of claim 8, wherein the backing ring is made from a PEEK (polyetheretherketone) material or from a metal material.

15. A method for preventing or minimizing distortion of a relatively pliable seal comprising the steps:
    creating a backing ring having an axially extending flange;
    mounting a seal ring comprising an outer diameter and an inner axially extending flange and causing the two axially extending flanges to contact one another;
    mounting the combination backing ring and seal ring in a sealing environment such that the axially extending flange of the seal ring is directed towards a pressure region of the sealing environment;
    positioning an energizer in a holding bore defined in part by the seal ring so that the energizer biases the two axially extending flanges in a radial direction; and
    engaging the backing ring with the seal ring in a detent engagement along the outer diameter of the seal ring.

16. The method of claim 15, further comprising the step of mounting a secondary backing ring in adjacent contact with the backing ring.

17. The method of claim 15, wherein the seal ring comprises an external axially extending flange.

18. The method of claim 17, further comprising placing a locking ring in mechanical contact with the external axially extending flange and wherein the locking ring defines at least in part a geometry of the holding bore.

19. The method of claim 17, wherein the energizer is an O-ring, a spring, or a canted coil spring.

20. The method of claim 17, further comprising the step of forming a relief clearance on the axially extending flange of the backing ring, said relief clearance comprising a radiussed section to reduce the axially extending flange in a radial direction.

21. The method of claim 17, further comprising incorporating fibers or fillers to reduce friction characteristics of the backing ring.

22. The method of claim 17, further comprising contacting the axially extending flange of the backing ring with the axially extending flange of the seal ring along an entire length of the axially extending flange of the backing ring.

23. The method of claim 17, wherein the energizer is a canted coil spring comprising a major axis and a minor axis, and wherein the axially extending flange of the backing ring and the axially extending flange of the seal ring are both located in line with the minor axis.

* * * * *